(12) United States Patent
Agaoglu et al.

(10) Patent No.: US 12,517,576 B2
(45) Date of Patent: Jan. 6, 2026

(54) GAZE BEHAVIOR DETECTION

(71) Applicant: Apple Inc., Cupertino, CA (US)

(72) Inventors: Mehmet N. Agaoglu, Dublin, CA (US); Andrew B. Watson, Los Gatos, CA (US); Tim H. Cornelissen, Mountain View, CA (US); Alexander G. Berardino, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/211,712

(22) Filed: Jun. 20, 2023

(65) Prior Publication Data

US 2023/0418372 A1 Dec. 28, 2023

Related U.S. Application Data

(60) Provisional application No. 63/356,119, filed on Jun. 28, 2022.

(51) Int. Cl.
*G06F 3/01* (2006.01)
(52) U.S. Cl.
CPC .................. *G06F 3/013* (2013.01)
(58) Field of Classification Search
CPC ....................................... G06F 3/013
USPC ......................................... 345/156
See application file for complete search history.

(56) References Cited

U.S. PATENT DOCUMENTS

| | | | |
|---|---|---|---|
| 2017/0364149 A1* | 12/2017 | Lu ........................ | G06F 3/013 |
| 2018/0232048 A1* | 8/2018 | Popovich ............... | G02B 6/105 |
| 2018/0299953 A1 | 10/2018 | Selker et al. | |
| 2019/0339770 A1* | 11/2019 | Kurlethimar ........ | G02B 27/017 |
| 2020/0043236 A1* | 2/2020 | Miller ..................... | G06F 3/013 |
| 2020/0103980 A1* | 4/2020 | Katz ....................... | G06F 3/0484 |
| 2021/0173474 A1* | 6/2021 | Sztuk ..................... | G06F 3/013 |
| 2021/0312684 A1* | 10/2021 | Zimmermann ..... | A63F 13/5255 |

(Continued)

FOREIGN PATENT DOCUMENTS

CN 111949131 A 11/2020

OTHER PUBLICATIONS

European Patent Office (ISA/EP), International Search Report and Written Opinion of the International Searching Authority, International Application No. PCT/US2023/025695, 13 pages Oct. 4, 2023.

(Continued)

*Primary Examiner* — Prabodh M Dharia
(74) *Attorney, Agent, or Firm* — Thompson Hine LLP

(57) ABSTRACT

Various implementations disclosed herein include devices, systems, and methods that determine a gaze behavior state to identify gaze shifting events, gaze holding events, and loss events of a user based on physiological data. For example, an example process may include obtaining eye data associated with a gaze during a first period of time (e.g., eye position and velocity, interpupillary distance, pupil diameters, etc.). The process may further include obtaining head data associated with the gaze during the first period of time (e.g., head position and velocity). The process may further include determining a first gaze behavior state during the first period of time to identify gaze shifting events, gaze holding events, and loss events (e.g., one or more gaze and head pose characteristics may be determined, aggregated, and used to classify the user's eye movement state using machine learning techniques).

24 Claims, 7 Drawing Sheets

(56) References Cited

U.S. PATENT DOCUMENTS

| | | | |
|---|---|---|---|
| 2022/0125299 A1* | 4/2022 | Abou Shousha | A61B 3/024 |
| 2022/0230079 A1* | 7/2022 | Tekín | G06V 10/82 |
| 2022/0254120 A1* | 8/2022 | Berliner | G06F 3/14 |
| 2023/0229246 A1* | 7/2023 | Gerhard | G06F 3/0238 |
| | | | 715/700 |
| 2023/0259203 A1* | 8/2023 | Mulliken | G06F 3/013 |
| | | | 345/156 |
| 2023/0282080 A1* | 9/2023 | Mulliken | A61B 5/168 |
| | | | 340/573.1 |
| 2023/0359273 A1* | 11/2023 | Zhang | G02B 27/017 |

OTHER PUBLICATIONS

Kothari, R. et al., Gaze-in-wild: a dataset for studying eye and head coordination in everyday activities, Arxiv.org, Cornell University Library, Ithaca, NY, 23 pages May 9, 2019.

CN 111949131 A—English Translation (provided with the International Search Report and Written Opinion of the International Searching Authority issued Oct. 4, 2023), 42 pages Nov. 17, 2020.

Kothari, Rakshit, Yang, Zhizhuo, Kanan, Christopher, Bailey, Reynod, Pelz, Jeff B. and Diz, Gabriel J.; "Gaze-in-wild: a Data set for studying eye and head coordination in everyday activities"; Scientific Reports; naturresearch; pp. 1-18; 2020.

Larrson, Linnea, Schwaller, Andrea; Nystrom, Marcus and Stridh, Martin; "Head movement compensation and multi-modal event detection in eye-tracking data for unconstrained head movements"; Journal of Neuroscience Methods 274; (2016); pp. 1-14.

Startsev, Mikhail, Agtzidis, Joannis and Door, Michael; "1D CNN with BLSTM for automated classification of fixations, saccades, and smooth pursuits"; Behavior Research methods (2019) 51:556-572.

Zemblys, Raimondas, Niehorster, Diederick C., Komogortsev, Oleg and Holmqvist, Kenneth; "Using machine learning to detect events in eye-tracking data"; Behav Res (2018) 50: 160-181.

* cited by examiner

GAZE BEHAVIOR DETECTION

CROSS-REFERENCE TO RELATED APPLICATIONS

This application claims the benefit of U.S. Provisional Application Ser. No. 63/356,119 filed Jun. 28, 2022, which is incorporated herein in its entirety.

TECHNICAL FIELD

The present disclosure generally relates to electronic devices, and in particular, to systems, methods, and devices for determining gaze behavior states of a user based on eye tracking and head tracking information.

BACKGROUND

Determining a user's intent while viewing content on an electronic device can facilitate a more meaningful experience. For example, a portion of the content (e.g., a selectable icon or button) may be automatically selected based on determining the user's intent to make such a selection and without the user necessarily having to perform a gesture, mouse click, or other input-device-based action to initiate the selection. However, a user may make different types of eye movements, and eye movements frequency and characteristics may depend on many factors including task, state of mind, and body pose. Thus, improved techniques for assessing targeted eye movement events with respect to the intent of users viewing and interacting with content may enhance the users' enjoyment, comprehension, and learning of the content. Content creators and systems may be able to provide better and more tailored user experiences based on determining with higher accuracy user intent to interact with portions of the content.

SUMMARY

Various implementations disclosed herein include devices, systems, and methods that provides a real-time gaze classification algorithm to classify eye movement and gaze behavior types based on eye tracking data (e.g., gaze direction, gaze angle, pupil diameter, pupil location, etc. obtained via video-based eye tracker, retinal/fundus imaging based eye tracking, electrooculography based eye tracking, magnetic scleral search coil based eye tracking, etc.) and head representation/tracking data (e.g., head pose, rotation speed, etc. using image data, depth data, accelerometer data, magnetometer data, gyroscope data etc.). Classifying gaze behavior into discrete "events" can be used to improve gaze base user interface interactions, user intent prediction, selective filtering of raw eye tracking data so that no latency added as a result of the filtering operation. In some implementations, scene understanding information may be utilized to determine object representation data in the current environment (e.g., location, depth-distance from user, speed, direction of motion of objects in the scene).

In some implementations, the techniques described herein can classify gaze behavior states in real-time. For example, the eye data and head pose data may be acquired at a current time as well as some history (e.g., last 10 samples) to make a prediction about the gaze event at a current time with minimal delay.

Some implementations focus on improving the accuracy for determining a gaze behavior states to identify gaze shifting events, gaze holding events, and loss events based on eye tracking and head pose data in real-time and determining sample-wise event levels for eye movement types. Eye movements occur all the time, even when a user thinks his or her gaze is fixed on an object, there are miniature eye movements occurring. Human eyes are foveated, meaning that a small part of the retina has high spatial resolution and the resolution drops off quickly away from the fovea, thus a person needs to move his or her eyes to use the highest acuity part of the retina to look at objects. There are multiple distinct types of eye movements and they can be classified in various ways depending on their function or physiological origin. The eye gaze behavior events or eye movements are saccades (brief, rapid, fast, jerky, and ballistic eye movements to search/analyze the scene and bring the high acuity part of retina on to the objects of interest), smooth pursuit (tracking an object while it is moving to keep the high acuity part of the retina on the object of interest), vestibulo-ocular reflex (VOR) (which are compensatory motion of the eyes to keep the gaze fixed on an object despite head motion/rotations), fixation (gaze and head are relatively stationary with only drifts), blinks/winks (full or partial closures of one or two eyes), data loss (where eye tracking or head tracking fails for various reasons), etc. For example, a more high-level classification can also be made where gaze behavior is classified into a fast behavior state, a stabilizing behavior state, and a loss behavior state. A fast behavior state may refer to saccades. A stabilizing behavior state may refer to movements where a user may be trying to stabilize his or her gaze on an object (e.g., smooth pursuit, VOR, or fixation events). A loss behavior state may refer to a blink, wink, and/or other data losses that may be determined as a loss behavior state due to other issues with eye/head tracking (e.g., dropped frames, segmentation issues, beyond tracking range of a particular eye tracking technology etc.).

Humans make different types of eye movements, but the frequency and characteristics of those eye movements depend on many factors including task, state of mind, body pose, etc. For example, lying down, sitting, standing, and walking produce markedly different eye/head movement behavior because of the primary contributors of head-stationary gaze versus head-free gaze, and head straight gaze versus head tilted gaze characteristics. Thus, a general problem that is addressed herein is creating a classifying algorithm that interprets eye/head tracking data on a device in real-time that is independent of the body pose or task of the user. In some implementations, a machine learning algorithm or another type of classifying algorithm may be implemented for classification of eye data and head tracking data into behaviorally and/or functionally relevant events. In some implementations, algorithms and/or machine learning models may be configured/refined based on (e.g., learning from) user specific actions. Targeted events can be as low level as fixation, smooth pursuit, saccade, VOR, blink, wink, data loss etc., or simply a higher level such as a stabilizing gaze state, a fast gaze state, and a loss state. A machine learning classifier may be trained using eye and head tracking data while users perform various tasks in various body/head poses such as sitting, standing, lying down, walking, etc. Depending on body pose and task requirements, gaze behavior and statistics can change drastically. Thus, a gaze classification algorithm presented herein is pose-independent and task-independent and is trained with eye data and head data from various scenarios. In addition to body poses, different tasks such as reading, watching, playing games, searching for an object, talking to someone, interacting with user interface elements, etc. (e.g., scene understanding information) may be represented in the training data.

Context may additionally be used to determine gaze behavior states to identify gaze shifting events, gaze holding events, and/or loss events. For example, a scene analysis of an experience can determine a scene understanding of the visual and/or auditory attributes associated with content being presented to the user (e.g., what is being presented in video content) and/or attributes associated with the environment of the user (e.g., where is the user, what is the user doing, what objects are nearby). These attributes of both the presented content and environment of the user can improve the determination of the user's intent based on his or her eye movement and gaze behavior regarding an interaction event (e.g., selecting an icon).

Physiological data, such as EEG amplitude/frequency, sensor data corresponding to pupil modulation, sensor data corresponding to eye gaze saccades, etc., can depend on the individual, characteristics of the scene in front of him or her (e.g., video content), and attributes of the physical environment surrounding the user including the activity/movement of the user. Physiological data can be obtained while using a device with eye tracking technology (and other physiologic sensors) while users perform tasks. In some implementations, physiological data can be obtained using other sensors, such as electroencephalography (EEG) sensors or electrodermal activity (EDA) sensors. Observing repeated measures of physiological data to an experience can give insights about the intent of the user based on his or her eye movement and gaze behavior.

In some implementations, determining whether to initiate an interaction event (e.g., predicting whether the user intends an interaction with a portion of displayed content) may be based on a characteristic of the user (e.g., physiological data) and an environment of the user (e.g., real-world physical environment, a virtual environment, or a combination of each). The device (e.g., a handheld, laptop, desktop, or head-mounted device (HMD)) provides an experience (e.g., a visual and/or auditory experience) of the real-world physical environment or an extended reality (XR) environment. The device obtains, with one or more sensors, physiological data (e.g., EEG amplitude, pupil modulation, eye gaze saccades, head movements measured by an inertial measurement unit (IMU), etc.) associated with the user. Based on the obtained physiological data, the techniques described herein can determine an interaction event during the experience. Based on the physiological data and associated physiological response (e.g., a user focusing on a particular region of the content), the techniques can provide a response to the user based on the interaction event and adjust the content corresponding to the experience.

Some implementations assess physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user should have the ability to access and otherwise find out anything that the system has collected or determined about him or her.

In general, one innovative aspect of the subject matter described in this specification can be embodied in methods that include the actions of, at an electronic device having a processor and one or more sensors, obtaining eye data associated with a gaze during a first period of time, obtaining head data associated with the gaze during the first period of time, and determining, based on the eye data and the head data, a first gaze behavior state during the first period of time to identify gaze shifting events, gaze holding events, or loss events.

These and other embodiments can each optionally include one or more of the following features.

In some aspects, the method further includes the actions of determining a scene understanding of a physical environment based on obtaining sensor data from the one or more sensors corresponding to the physical environment. In some aspects, determining the first gaze behavior state during the first period of time is based on the scene understanding of the physical environment.

In some aspects, the physical environment includes one or more objects, and wherein determining the scene understanding of the physical environment includes determining a location, a speed, or a direction of motion of the one or more objects. In some aspects, determining a scene understanding includes generating a three-dimensional (3D) representation of the physical environment.

In some aspects, the eye data includes positional information and velocity information for a left eye and a right eye. In some aspects, the eye data includes an interpupillary distance (IPD) between a right eye and a left eye, and a diameter of the left eye and a diameter of the right eye. In some aspects, the eye data includes a direction of the gaze, or a velocity of the gaze. In some aspects, the eye data includes an image of an eye or electrooculography (EOG) data.

In some aspects, the head data includes images of a head from the one or more sensors. In some aspects, obtaining the head data includes tracking a pose and a movement of a head.

In some aspects, determining the first gaze behavior state during the first period of time is based on a set of data acquired prior to the first period of time. In some aspects, the first gaze behavior state is a type of gaze behavior state of a plurality of gaze behavior states, wherein the plurality of gaze behavior states includes a gaze holding state, a gaze shifting state, and an eye tracking loss state.

In some aspects, the method further includes the actions of identifying a gaze shifting event during the first period of time based on determining that the first gaze behavior state includes a fast gaze state during the first period of time.

In some aspects, the method further includes the actions of identifying a gaze holding event during the first period of time based on determining that the first gaze behavior state includes a stabilizing gaze state during the first period of time.

In some aspects, the method further includes the actions of updating a view of a display of the electronic device during the first period of time based on determining the first gaze behavior state during the first period of time. In some aspects, updating the view of the display is based on the eye data or the head data.

In some aspects, the first gaze behavior state during the first period of time is based on using a machine learning classifier model, wherein the eye data and the head data are input into the machine learning classification model to identify gaze shifting events, gaze holding events, and loss events. In some aspects, the machine learning classification model is trained based on a plurality of body poses. In some aspects, the plurality of body poses includes a lying pose, a standing pose, a sitting pose, a walking pose, or a combination thereof.

In some aspects, the eye data or the head data is obtained from sensor data from the one or more sensors, and wherein the sensor data includes depth data and light intensity image data obtained during a scanning process.

In some aspects, the electronic device is a head-mounted device (HMD).

These and other embodiments can each optionally include one or more of the following features.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
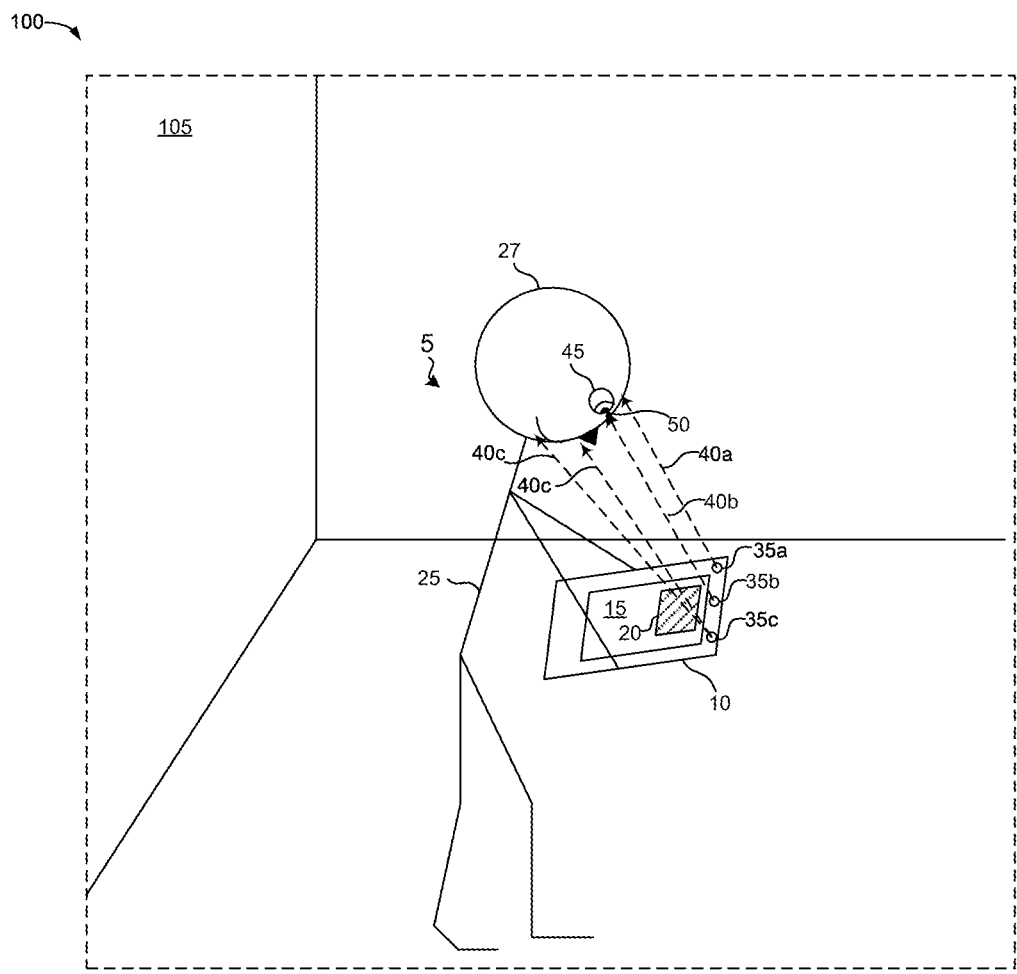
FIG. 1 illustrates a device obtaining sensor data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 105 (e.g., a room) including a device 10 with a display 15. In some implementations, the device 10 displays content 20 to a user 25. For example, content 20 may be a button, a user interface icon, a text box, a graphic, an avatar of the user or another user, etc. In some implementations, the content 20 can occupy the entire display area of display 15.

The device 10 obtains image data, motion data, and/or physiological data (e.g., pupillary data, facial feature data, etc.) from the user 25 via a plurality of sensors (e.g., sensors 35a, 35b, and 35c). For example, the device 10 obtains eye gaze characteristic data 40b via sensor 35b, upper facial feature characteristic data 40a via sensor 35a, and lower facial feature characteristic data 40c via sensor 35c. Additionally, each of the plurality of sensors (e.g., sensors 35a, 35b, and 35c) can capture information about the position, location, motion, pose, etc., of the head 27 and/or body of the user 25.

While this example and other examples discussed herein illustrate a single device 10 in a real-world environment 105, the techniques disclosed herein are applicable to multiple devices as well as to other real-world environments. For example, the functions of device 10 may be performed by multiple devices, with the sensors 35a, 35b, and 35c on each respective device, or divided among them in any combination.

In some implementations, the plurality of sensors (e.g., sensors 35a, 35b, and 35c) may include any number of sensors that acquire data relevant to the appearance of the user 25. For example, when wearing a head-mounted device (HMD), one sensor (e.g., a camera inside the HMD) may acquire the pupillary data for eye tracking, and one sensor on a separate device (e.g., one camera, such as a wide range view) may be able to capture all of the facial feature data of the user. Alternatively, if the device 10 is an HMD, a separate device may not be necessary. For example, if the device 10 is an HMD, in one implementation, sensor 35b may be located inside the HMD to capture the pupillary data (e.g., eye gaze characteristic data 40b), and additional sensors (e.g., sensor 35a and 35c) may be located on the HMD but on the outside surface of the HMD facing towards the user's head/face to capture the facial feature data (e.g., upper facial feature characteristic data 40a via sensor 35a, and lower facial feature characteristic data 40c via sensor 35c) and capture information about the position, location, motion, pose, etc., of the head 27 and/or body of the user 25.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, electronic device 10 may be worn by a user. For example, electronic devices 10 may be a watch, a HMD, head-worn device (glasses), headphones, an ear mounted device, and so forth. In some implementations, functions of the device 10 is accomplished via two or more devices, for example, a mobile device and base station or a head mounted device and an ear mounted device. Various capabilities may be distributed amongst multiple devices, including, but not limited to, power capabilities, CPU capabilities, GPU capabilities, storage capabilities, memory capabilities, visual content display capabilities, audio content production capabilities, and the like. The multiple devices that may be used to accomplish the functions of electronic device 10 may communicate with one another via wired or wireless communications and/or via an intermediary device such as a playback session server.

In some implementations, the device 10 includes an eye tracking system for detecting eye position and eye movements via eye gaze characteristic data 40*b*. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through hand gestures, finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program products configured for execution by one or more processors.

In some implementations, the device 10 employs various physiological sensor, detection, or measurement systems. Detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response (e.g., eye gaze characteristic data 40*b*). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter. In some implementations, the device 10 may further determine the interpupillary distance (IPD) between a right eye and a left eye of the user.

The user data (e.g., upper facial feature characteristic data 40*a*, lower facial feature characteristic data 40*c*, and eye gaze characteristic data 40*b*), including information about the position, location, motion, pose, etc., of the head 27 and/or body of the user 25, may vary in time and the device 10 may use the user data to generate and/or provide a representation of the user.

In some implementations, the user data (e.g., upper facial feature characteristic data 40*a* and lower facial feature characteristic data 40*c*) includes texture data of the facial features such as eyebrow movement, chin movement, nose movement, cheek movement, etc. For example, when a person (e.g., user 25) smiles, the upper and lower facial features (e.g., upper facial feature characteristic data 40*a* and lower facial feature characteristic data 40*c*) can include a plethora of muscle movements that may be replicated by a representation of the user (e.g., an avatar) based on the captured data from sensors 35.

The physiological data (e.g., eye data, head/body data, etc.) may vary in time and the device 10 may use the physiological data to measure one or both of a user's physiological response to the visual characteristic 30 (e.g., looking at particular content on the display 15 such as reading text) or the user's intention to interact with content 20. For example, when presented with content 20, which may include an interactive element, by a device 10, the user 25 may select the interactive element without requiring the user 25 to complete a physical button press based on the user's eye movements and gaze behavior associated with eye data, head/body data, etc. In some implementations, the physiological data may include the physiological response to a visual or an auditory stimulus of a radius of the pupil 50 after the user 25 glances at content 20, measured via eye-tracking technology (e.g., via an HMD). In some implementations, the physiological data includes EEG amplitude/frequency data measured via EEG technology, or EMG data measured from EMG sensors or motion sensors.

Figure 2A:
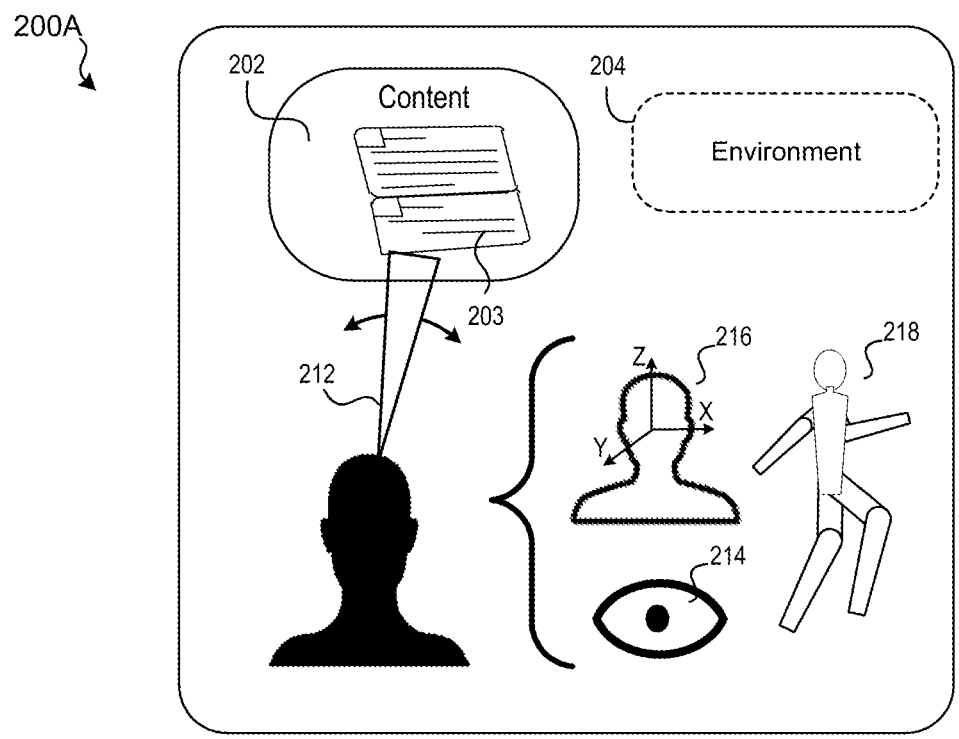
FIGS. 2A and 2B illustrate detecting eye movement and gaze behavior of a user viewing content based on physiological data in accordance with some implementations.
Figure 2B:
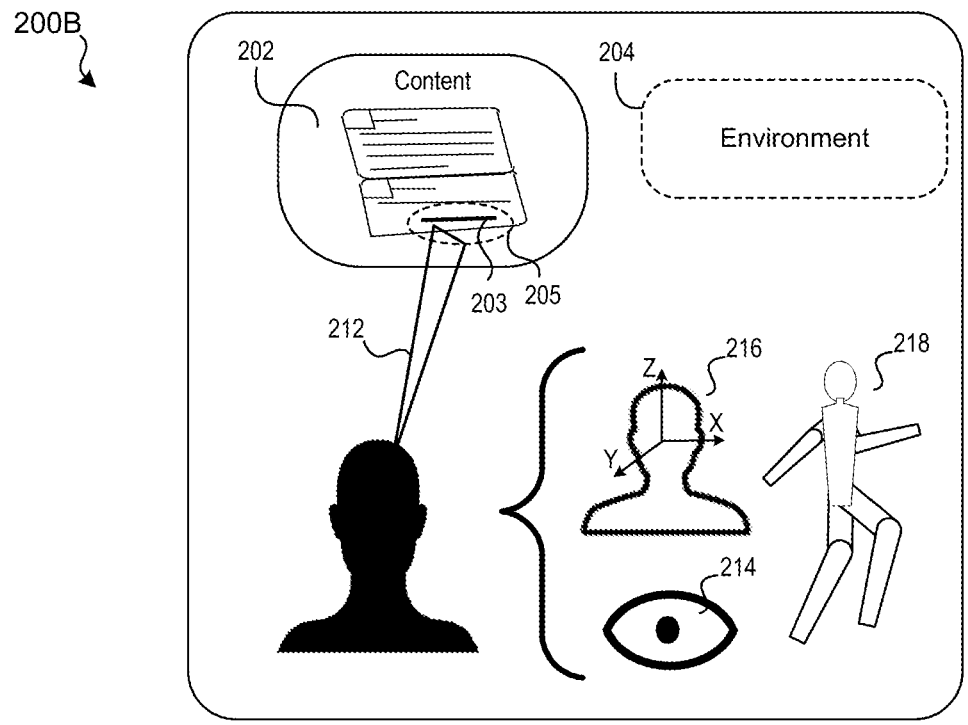

FIGS. 2A and 2B illustrate detecting eye movement and gaze behavior of a user viewing content based on physiological data. FIG. 2A illustrates a user (e.g., user 25 of FIG. 1) being presented with content 202 in an environment 204 during a content presentation where the user, via obtained physiological data, has a physiological response to the content (e.g., the user looks towards portions of the content as detected by eye gaze characteristic data 212). For example, at content presentation instant 200A, a user is being presented with content 202 that includes visual content (e.g., a video/image of an application that includes text), and the user's physiologic data such as pupillary data 214, head data 216, and body data 218 is monitored. FIG. 2B illustrates a similar example as FIG. 2A, except that the user focuses his or her gaze upon the interactive element 203 (e.g., the user wants to select the text, such as an embedded interactable icon, being presented to him or her), as illustrated at selection notification 205. Therefore, the content 202 may be updated based on the interaction/focus of the user upon the interactive element 203 (e.g., the user wants to select the embedded interactable icon represented by interactive element 250).

In the particular examples of FIGS. 2A and 2B, at content presentation instant 200A, the user's eye gaze characteristic is less focused on the content 202. Then, at content presentation instant 200B of FIG. 2B (e.g., during a focused stage), the user's eye gaze characteristic 212 appears to be focused on the interactive element 203 of the content 202. For example, the system can determine that the user's gaze may be focused upon a particular area or text, and is no longer just gazing at the content (e.g., reading the text), but wants to select a portion of the content (e.g., select an icon or engage with a portion of the text, such as placing an order on a menu) based on user's eye gaze characteristic 212, pupillary data 214, head data 216, and/or body data 218.

In some implementations, the body data 218 includes tracking data while users perform various tasks in various body/head poses such as sitting, standing, lying down, walking, etc., that may be used to determine that the user has a particular gaze behavior state to identify gaze shifting events, gaze holding events, and/or loss events (or a combination thereof). In an exemplary implementation, the body data 218 is not used during a real-time classification of the gaze behavior event, but the body data 218 is used to train a classification algorithm because depending on body pose and task requirements, gaze behavior and associated statistics can change drastically. For example, a user lying down while watching content on device 10 may have different gaze characteristics then a user sitting at his or her desk watching content on device 10 (or walking, standing, etc.). Thus, a gaze classification algorithm as discussed herein and illustrated in FIG. 3, is pose-independent and task-independent and is trained with eye data and head data from various scenarios.

Figure 3:
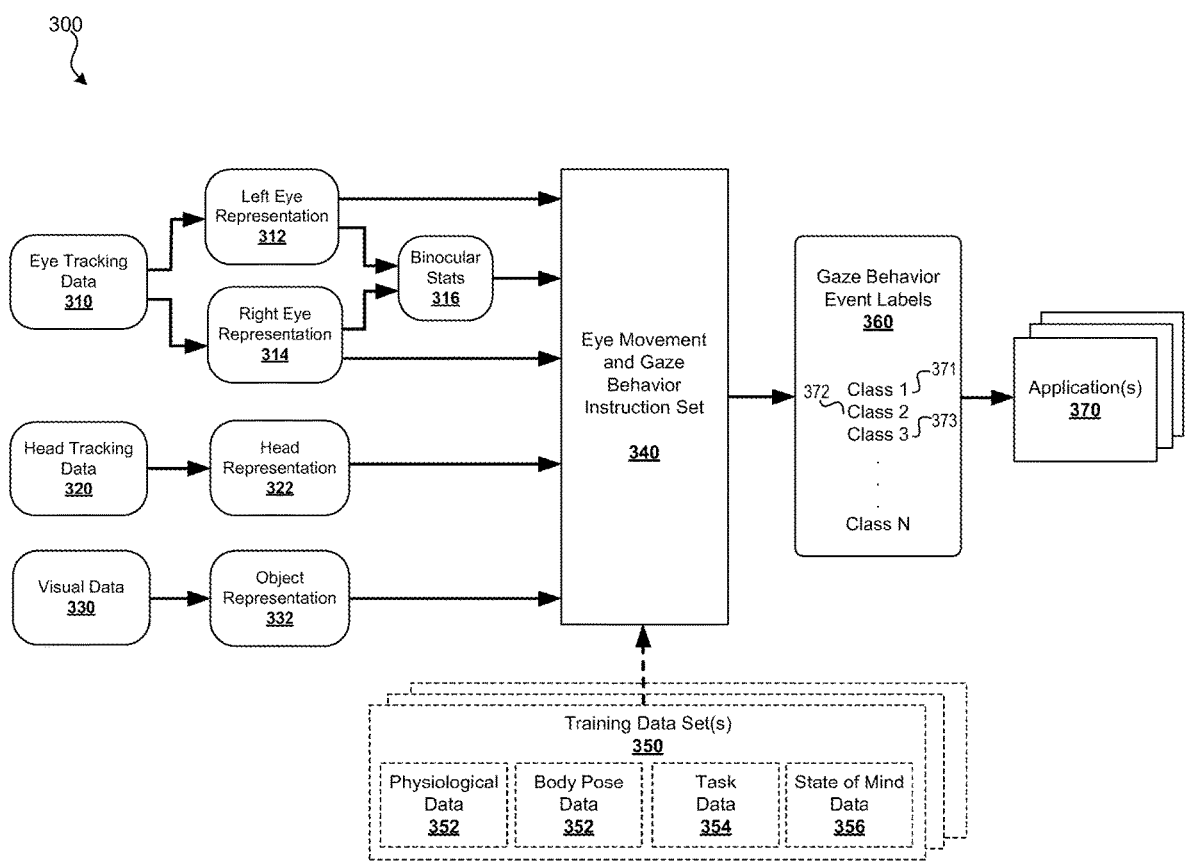
FIG. 3 illustrates a classification framework for gaze behavior events in accordance with some implementations.

FIG. 3 illustrates an example environment 300 for a classification framework for detecting and classifying gaze behavior events in accordance with some implementations. In some implementations, the process flow of the example environment 300 is performed on a device (e.g., device 10 of FIG. 1), such as a mobile device, desktop, laptop, or server device. The content of the one or more applications 370 can be displayed on a device (e.g., device 10 of FIG. 1) that has a screen (e.g., display 15) for displaying images and/or a screen for viewing stereoscopic images such as an HMD. In some implementations, the process flow of the example environment 300 is performed on processing logic, including hardware, firmware, software, or a combination thereof. In some implementations, the process flow of the example environment 300 is performed on a processor executing code stored in a non-transitory computer-readable medium (e.g., a memory).

The process flow of the example environment 300 is focused on a gaze classification algorithm of the eye movement and gaze behavior instruction set 340 that is pose-independent and task-independent and is trained with eye data and head data from various scenarios (e.g., one or more training data sets 350). In particular, the process flow for example environment 300 is acquiring physiological data over a period of time at the eye movement and gaze behavior instruction set 340 and determining gaze behavior event labels 360, in real-time, for a user's eye movements based on the physiological data. The gaze behavior event labels 360 may include different classifications of gaze behavior events, such as Class-1 371 (e.g., a fast behavior state—saccades), Class-2 372 (e.g., a stabilizing behavior state—smooth pursuit, VOR, or fixation events), or Class-3 373 (e.g., a loss behavior state—blink, wink, or other data losses). The gaze behavior event labels 360 can then be sent to one or more applications 370 that can quickly utilize that information as an interaction event according to techniques described herein (e.g., predicting whether the user intends an interaction with a portion of displayed content).

In an exemplary embodiment, the physiological data that the eye movement and gaze behavior instruction set 340 utilizes to determine the gaze behavior event labels 360 in real-time for a user's eye movements is based on eye tracking data 310 and head tracking data 320. The eye tracking data 310 may include video-based data, pupil and glint-based data, retinal imaging-based data, scleral coil-based data, EOG-based data, and the like, or any other eye movement data discussed herein. The eye tracking data may then be obtained and analyzed by the eye movement and gaze behavior instruction set 340 or another eye tracking analysis algorithm to determine left eye representation 312, a right eye representation 314, and binocular stats 316. The left eye representation 312 and the right eye representation 314 information may include analysis on particular gaze angles, pupil size, speed, acceleration, eye openness, confidence, etc. for each particular eye. The binocular stats 316 may include information such as eye vergence, IPD, and the like. The head tracking data 320 may include scene camera data positions towards the head of the user (e.g., RGB or IR cameras), IMU data, depth sensing data, IR flood light data, and the like, or any other head movement data discussed herein. The head tracking data may then be obtained and analyzed by the eye movement and gaze behavior instruction set 340 or another head tracking analysis algorithm to determine head representation 322.

In some implementations, the eye movement and gaze behavior instruction set 340 may further obtain additional data to analyze in real-time before determining an event label for the particular gaze behavior. For example, visual data 330 may be utilized by the eye movement and gaze behavior instruction set 340. Visual data 330 may include scene camera information (e.g., image data of the physical environment), VR/AR or other content currently being displayed to the user, depth map, a saliency map, etc. Additionally, the visual data may be analyzed by an object detection/representation algorithm to determine and provide object representation data 332 to the eye movement and gaze behavior instruction set 340. Object representation data 332 may include location, speed, direction of motion, and the like for any or all identified objects in the displayed content and/or physical environment. The object representation data 332 may be utilized by the eye movement and gaze behavior instruction set 340 to refine the eye behavior event classifications based on (e.g., learning from) object specific actions. For example, an object displayed in the scene, such as a dog, may be identified, and the dog's location, speed, direction of motion, etc. may be tracked such that if the user gazes towards the dog (e.g., an interruption) the classification analysis techniques described herein may utilize the information to further refine the eye behavior event classification.

The eye movement and gaze behavior instruction set 340 may be trained using eye tracking data 310, head tracking data 320, and visual data 330 while users perform various tasks in various body/head poses such as sitting, standing, lying down, walking, etc. Depending on body pose and task requirements, gaze behavior and statistics can change drastically. Thus, a gaze classification algorithm for the eye movement and gaze behavior instruction set 340 presented herein is pose-independent and task-independent and is trained with eye data and head data from various scenarios. In addition to body poses, different tasks such as reading, watching, playing games, searching for an object, talking to someone, interacting with user interface elements, etc. (e.g., scene understanding information) may be represented in the training data sets 350. For example, the training data sets 350 may include physiological data 352 (e.g., eye tracking data 310, head tracking data 320, etc.), body pose data 352 (e.g., information on the pose of the body of the user such as sitting, standing, lying down, etc.), task data 354 (e.g., information on the particular task of the user such as reading, meditating, walking, etc.), and state of mind data 356 (e.g., a user's attentive state, stress detection, mind wandering, etc.).

Figure 4:
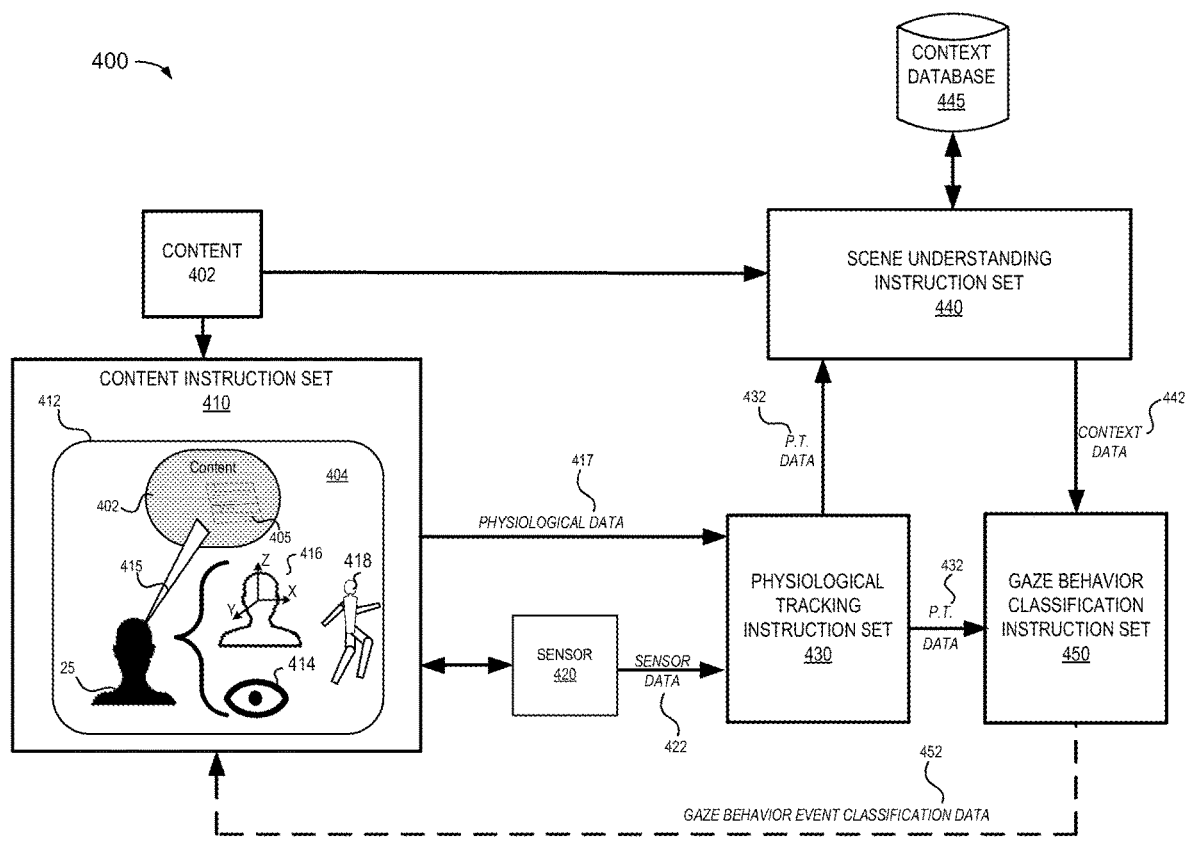
FIG. 4 illustrates a system diagram for detecting a gaze behavior event of the user viewing content based on physiological data in accordance with some implementations.

FIG. 4 is a system flow diagram of an example environment 400 in which a gaze behavior classification system can detect a gaze behavior event of the user viewing content based on physiological data according to some implementations. In some implementations, the system flow of the example environment 400 is performed on a device (e.g., device 10 of FIG. 1), such as a mobile device, desktop, laptop, or server device. The content of the example environment 400 can be displayed on a device (e.g., device 10 of FIG. 1) that has a screen (e.g., display 15) for displaying images and/or a screen for viewing stereoscopic images such as an HMD. In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires and presents content (e.g., video content or a series of image data) to user 25, analyzes the content and/or the environment for context data, obtains physiological data associated with the user during presentation of the content (e.g., eye data, head/body data, etc.), assesses a user's intent to interact with a portion of the content (e.g., interactable element 405) based on determining a gaze behavior state based on the physiological data and updates the content based on the interaction event (e.g., if the user 25 focuses on the interactable element 405 for a certain period of time to activate or select the interactable element 405). For example, a gaze behavior classification technique described herein determines, based on obtained physiological data and determined gaze behavior (e.g., to identify gaze shifting events, gaze holding events, loss events, or a combination thereof), the user's intent to interact with a portion of the content (e.g., interactable element 405) during an experience (e.g., watching a video) by updating the content that is based on the interaction event of the user (e.g., a notification, auditory signal, an alert, and the like, that alerts the user that they have selected the interactable element 405 during the presentation of content 402).

The example environment 400 includes a content instruction set 410 that is configured with instructions executable by a processor to provide and/or track content 402 for display on a device (e.g., device 10 of FIG. 1). For example, the content instruction set 410 provides content presentation instant 412 that includes content 402 to a user 25 while user is within a physical environment 404 (e.g., a room, outside, etc.). For example, content 402 may include background image(s) and sound data (e.g., a video). The content presentation instant 412 may be an XR experience that includes some virtual content and some images or views of a physical environment. Alternatively, the user may be wearing an HMD and is looking at a real physical environment either via a live camera view, or the HMD allows a user to look through the display, such as wearing smart glasses that user can see through, but still be presented with visual and/or audio cues. During an experience, while a user 25 is viewing the content 402, eye gaze characteristic data 415 and pupillary data 414 of the user's eyes can be monitored and sent as physiological data 417. Additionally, other physiological data can be monitored and sent as physiological data 417 such as head movement data 416 and body movement data 418 obtained from an IMU or image data.

The environment 400 further includes a physiological tracking instruction set 430 to track a user's physiological attributes as physiological tracking data 432 using one or more of the techniques discussed herein or as otherwise may be appropriate. For example, the physiological tracking instruction set 430 may acquire physiological data 417 (e.g., eye gaze characteristic data 415, pupillary data 414) from the user 25 viewing the content 402. Additionally, or alternatively, a user 25 may be wearing a sensor 420 (e.g., such as an EEG sensor, an EDA sensor, heart rate sensor, etc.) that generates sensor data 422 (e.g., IMU or pose data for the head or body, EEG data, EDA data, heart rate data, and the like) as additional physiological data. Thus, as the content 402 is presented to the user as content presentation instant 412, the physiological data 417 (e.g., eye gaze characteristic data 415, pupillary data 414) and/or sensor data 422 (e.g., head movement data 416 and body movement data 418) is sent to the physiological tracking instruction set 430 to track a user's physiological attributes as physiological tracking data 432, using one or more of the techniques discussed herein or as otherwise may be appropriate.

In an example implementation, the environment 400 further includes a scene understanding instruction set 440 that is configured with instructions executable by a processor to obtain the experience data presented to the user (e.g., content 402) and other sensor data (e.g., image data of the environment 404, the user's 25 face and/or eye's, etc.), and generate a scene understanding as context data 442 (e.g., identifying people, objects, etc. of the content 402 and the environment 404). For example, the scene understanding instruction set 440 acquires content 402 and sensor data 422 (e.g., image data) from the sensor 420 (e.g., an RGB camera, a depth camera, etc.) and determines context data 442 based on identifying areas of the content while the user is viewing the presentation of the content 402 (e.g., a first time viewed content/video). Alternatively, the scene understanding instruction set 440 selects context data associated with content 402 from a context database 445 (e.g., if the content 402 was previously analyzed by the scene understanding instruction set, e.g., a previously viewed/analyzed video). In some implementations, the scene understanding instruction set 440 generates a scene understanding associated with content 402 and/or environment 404 as the context data 442. For example, the scene understanding can be utilized to track the overall context of what the user may be focused on during the presentation of content 402, or where the user is, what the user is doing, what physical objects or people are in the vicinity of the user with respect to the environment 404.

In an example implementation, the environment 400 further includes gaze behavior classification instruction set 450 that is configured with instructions executable by a processor to assess the user's 25 intent to interact with (e.g., select) the interactable element 405 (e.g., a portion of the text) based on a gaze behavior and eye movement assessment using one or more of the techniques discussed herein or as otherwise may be appropriate. For example, intent of the user 25 to interact with the interactable element 405 that may be assessed such as determining that the user 25 is focused on a particular illuminated region of the interactable element 405 (e.g., such as interactable element 203 of FIG. 2B). In particular, the gaze behavior classification instruction set 450 acquires physiological tracking data 432 from the physiological tracking instruction set 430 and determines the intent of the user 25 to interact with (select) the interactable element 405 during the presentation of the content 402 while the user is viewing content 402 (e.g., reading text with embedded selectable elements). In some implementations, the gaze behavior classification instruction set 450 can then provide gaze behavior event classification data 452 (e.g., data that signals that the user selected the interactable element 405 and reading characteristics associated with the user 25 while viewing the content 402) to the content instruction set 410 based on the gaze behavior classification.

In some implementations, the gaze behavior classification instruction set 450 also acquires context data 442 from the scene understanding instruction set 440 (e.g., scene understanding data) with the physiological tracking data 432 to determine the intent of the user 25 to interact with (select) the interactable element 405 during the presentation of the content 402. For example, the context data 442 may provide a scene analysis that can be used by the gaze behavior classification instruction set 450 to understand what the person is looking at, where they are at, etc., and improve the determination of the intent of the user to select the interactable element 405.

Figure 5:
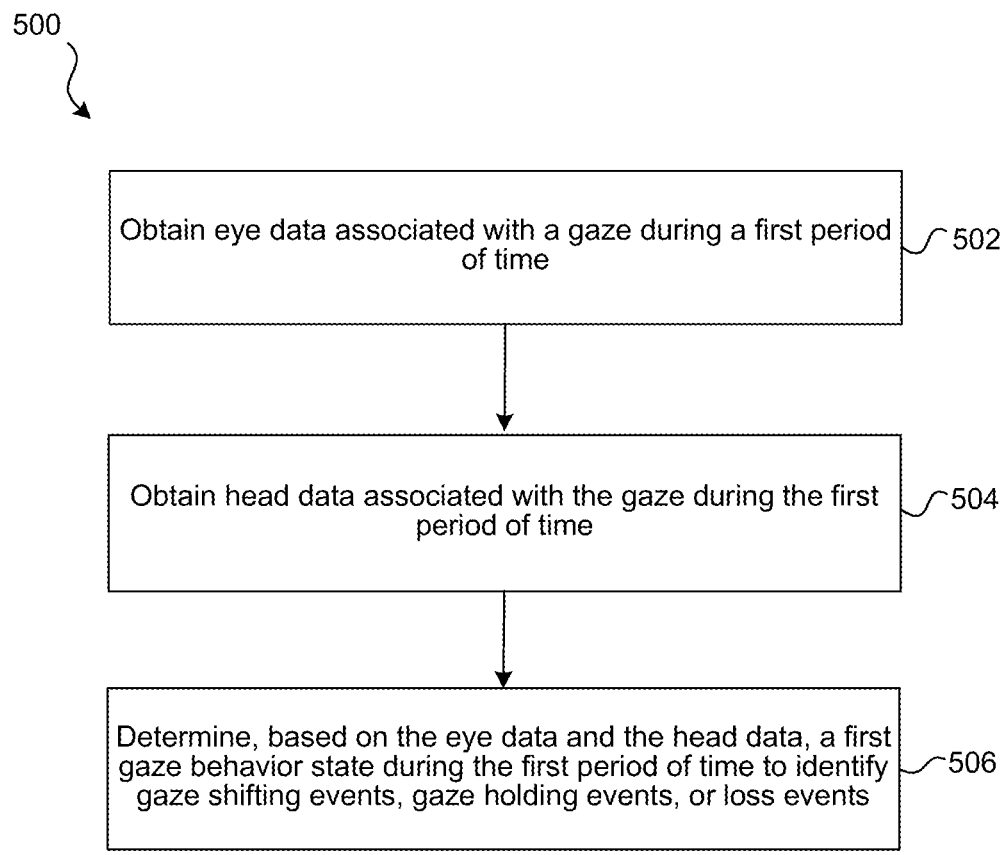
FIG. 5 is a flowchart representation of a method for determining a gaze behavior state to identify gaze shifting events, gaze holding events, and loss events of a user based on physiological data in accordance with some implementations.

FIG. 5 is a flowchart illustrating an exemplary method 500. In some implementations, a device (e.g., device 10 of FIG. 1) performs the techniques of method 500 to determine a gaze behavior state to identify gaze shifting events, gaze holding events, and loss events of a user based on physiological data. In some implementations, the techniques of method 500 are performed on a mobile device, desktop, laptop, HMD, or server device. In some implementations, the method 500 is performed on processing logic, including hardware, firmware, software, or a combination thereof. In some implementations, the method 500 is performed on a processor executing code stored in a non-transitory computer-readable medium (e.g., a memory).

At block 502, the method 500 obtains eye data associated with a gaze during a first period of time. In some implementations, the information for the eyes may be acquired for both azimuth and elevation for both position and velocity for each eye (e.g., eight channels of data for the classification algorithm). In some implementations, the eye data may further include IPD information (e.g., one channel of data for the classification algorithm) and a pupil diameter for the left eye and the right eye (e.g., two channels of data for the classification algorithm). Obtaining eye data may involve obtaining EEG information, images of the eye, and/or EOG data from which gaze direction, gaze angle, and/or eye movement can be determined. In some implementations, the eye data may further include a direction of the gaze, a velocity of the gaze, or a combination thereof.

In some implementations, obtaining eye data is based on obtaining sensor data of a user. For example, the sensor data (e.g., live data, such as video content that includes light intensity data (RGB) and depth data), is associated with a point in time, such as images from inward/down facing sensors while the user is wearing an HMD associate with a frame (e.g., sensors 35*a*, 35*b*, 35*c* shown in FIG. 1). In some implementations, the sensor data includes depth data (e.g., infrared, time-of-flight, etc.) and light intensity image data obtained during a scanning process.

In some implementations, obtaining physiological data (e.g., pupillary data 40) is associated with a gaze of a user that may involve obtaining images of the eye or electrooculography signal (EOG) data from which gaze direction and/or movement can be determined. In some implementations, the physiological data includes at least one of skin temperature, respiration, photoplethysmogram (PPG), electrodermal activity (EDA), eye gaze tracking, and pupillary movement that is associated with the user. In some implementations, obtaining physiological data includes head movements of the user (e.g., obtained from an IMU or from image sensor data), such as head tracking data 320.

In some implementations, determining the movement and/or the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement and corresponding reading characteristics more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter to be calculated based on a single calibration of user 25. Utilizing techniques such as pupil-center-corneal reflection (PCCR), pupil tracking, and pupil shape, the device 10 may calculate the pupil diameter, as well as a gaze angle of the eye 45 from a fixed point of the head 27 and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

Some implementations obtain physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user will have the ability to access and otherwise find out anything that the system has collected or determined about him or her. User data is stored securely on the user's device. User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification or biometric identification. The user data associated with the user's body and/or attentive state may be stored in such a secure enclave, restricting access to the user data and restricting transmission of the user data to other devices to ensure that user data is kept securely on the user's device. User data may be prohibited from leaving the user's device and may be used only in machine learning models and other processes on the user's device.

At block 504, the method 500 obtains head data associated with the gaze during the first period of time. The head data may include images of a head of the user from the one or more sensors. In some implementations, obtaining the head data includes tracking a pose and a movement of the head of the user. For example, head motion and pose may be acquired based on position information and velocity information acquired from one or more sensors. The information for the head may be acquired for both azimuth and elevation for both position and velocity (e.g., four channels of data for the classification algorithm). Obtaining the head data may involve obtaining images of the head (e.g., RGB or IR), IMU, depth sensing from IFC, IR flood light, and the like.

In some implementations, obtaining sensor data associated with the head data may include obtaining a second set of data corresponding to one or more partial views of the face from one or more image sensors while a user is using (e.g., wearing) an electronic device (e.g., HMD). For example, obtaining sensor data may include obtaining live image data. In some implementations, the second set of data includes partial images of the face of the user and thus may not represent all of the features of the face that are represented in the enrollment data. For example, the second set of images may include an image of some of the foreface/brow eyes (e.g., facial feature characteristic data 40a) from an upward-facing sensor (e.g., sensor 35a of FIG. 1). Additionally, or alternatively, the second set of images may include an image of some of the eyes (e.g., eye gaze characteristic data 40b) from an inward-facing sensor (e.g., sensor 35b of FIG. 1). Additionally, or alternatively, the second set of images may include an image of some of the cheeks, mouth and chin (e.g., facial feature characteristic data 40c) from a downward facing sensor (e.g., sensor 35c of FIG. 1). In some implementations, the electronic device includes a first sensor (e.g., sensor 35a of FIG. 1) and a second sensor (e.g., sensor 35c of FIG. 1), where the second set of data is obtained from at least one partial image of the face of the user from the first sensor from a first viewpoint (e.g., upper facial characteristic data 40a) and from at least one partial image of the face of the user from the second sensor from a second viewpoint (e.g., lower facial characteristic data 40c) that is different than the first viewpoint (e.g., multiple IFC cameras to capture different viewpoints of the user's facial and body movements).

At block 506, the method 500 determines, based on the eye data and the head data (e.g., collected at blocks 502 and 504, respectively), a first gaze behavior state during the first period of time to identify gaze shifting events, gaze holding events, or loss events (or a combination thereof). For example, the techniques described herein can obtain eye and head data associated with a gaze of a user, and eye and head pose characteristics may be determined, aggregated, and used to classify the user's eye movement state using machine learning techniques. The classes may include main classes such as a gaze holding state, a gaze shifting state, and a loss behavior state. In some implementations, the three main classes may include additional subclasses that may be classified. For example, the gaze holding state (e.g., a stabilizing behavior state) may include fixation, VOR, pursuit, slow vergence, and the like. The gaze shifting state (e.g., a fast behavior state) may include one or more saccade levels, fast vergence, and the like. In some implementations, a main class may include a combination of the gaze holding state and the gaze shifting state (e.g., optokinetic nystagmus, ocular following responses (OFR), vestibular nystagmus, etc.). A loss behavior state (e.g., eye tracking loss) may include blink, wink, and other data loss events that may be determined as a loss behavior state due to other issues with eye/head tracking (e.g., dropped frames, segmentation issues, etc.).

In some implementations, determining that the user has the first gaze behavior state during the first period of time is based on a set of data acquired prior to the first period of time. For example, in order to determine in real-time the user's gaze behavior and eye movements, a prior period of time (e.g., last N samples, where N is a positive integer, such as the last 10 samples of data) for the eye data and/or head data may be used in combination with a current set of data.

In some implementations, the first gaze behavior state is a type of gaze behavior state of a plurality of gaze behavior states, and the plurality of gaze behavior states includes a stabilizing gaze state, a fast gaze state, and a loss gaze state. In some implementations, the method 500 includes identifying a gaze shifting event associated with the user during the first period of time based on determining that the first gaze behavior state includes a fast gaze state during the first period of time. In some implementations, the method 500 includes identifying a gaze holding event associated with the user during the first period of time based on determining that the first gaze behavior state includes a stabilizing gaze state during the first period of time. For example, a more high level classification can also be made where gaze behavior is classified into a fast behavior state, a stabilizing behavior state, and a loss behavior state. A fast behavior state may refer to saccades. A stabilizing behavior state may refer to movements where a user may be trying to stabilize his or her gaze on an object (e.g., smooth pursuit, vestibulo-ocular reflect (VOR), or fixation events). A loss behavior state may refer to a blink, wink, and/or other data losses that may be determined as a loss behavior state due to other issues with eye/head tracking (e.g., dropped frames, segmentation issues, etc.).

In some implementations, determining that the user has the first gaze behavior state during the first period of time is based on using a machine learning classifier model, wherein the eye data and the head data are input into the machine learning classification model to identify gaze shifting events, gaze holding events, and/or loss events (or a combination thereof). In some implementations, the machine learning classification model is trained based on a plurality of body poses for a group of users. For example, a group of users for the training data may be told to perform a number of body poses/actions such as lying down, standing, sitting, walking, etc., and eye data and head data may be acquired for the machine learning classification model to identify gaze shifting events, gaze holding events, and loss events that can accommodate the range of eye and head movements based on the different body poses/actions. Depending on body pose and task requirements, gaze behavior and statistics can change drastically. Thus, the gaze classification algorithm presented herein is pose-independent and task-independent and is trained with eye data and head data from various scenarios.

In some implementations, the method 500 includes determining a scene understanding of a physical environment based on obtaining sensor data from the one or more sensors corresponding to the physical environment. In some implementations, determining that the user has the first gaze behavior state during the first period of time is based on the scene understanding of the physical environment. In some implementations, the physical environment includes one or more objects, and determining the scene understanding of the physical environment includes determining a location, a speed, or a direction of motion of the one or more objects. For example, determining a scene understanding may include identifying one or more of the objects and their positions based on images the user's current room, depth data, etc., including location, speed, direction of motion of objects in the scene/environment. In some implementations, determining a scene understanding includes generating a three-dimensional (3D) representation of the physical environment. For example, after a scanning process a 3D model, such as a 3D point cloud or a 3D rendering may be generated for the physical environment and/or the objects within the physical environment.

In some aspects, the method 500 determines a context of the experience based on sensor data of the environment. For example, determining a context may involve using computer vision to generate a scene understanding of the visual and/or auditory attributes of the environment—where is the user, what is the user doing, what objects are nearby. Additionally, a scene understanding of the content presented to the user may be generated that includes the visual and/or auditory attributes of what the user was watching.

In some aspects, different contexts of the content presented and the environment are analyzed to determine where the user is, what the user is doing, what objects or people are nearby in the environment or within the content, what the user did earlier (e.g., meditated in the morning). Additionally, context analysis may include image analysis (semantic segmentation), audio analysis (jarring sounds), location sensors (where user is), motion sensors (fast moving vehicle), and even access other user data (e.g., a user's calendar). In an exemplary implementation, the method 500 may further include determining the context of the experience by generating a scene understanding of the environment based on the sensor data of the environment, the scene understanding including visual or auditory attributes of the environment, and determining the context of the experience based on the scene understanding of the environment.

In some implementations, the sensor data includes image data, and generating the scene understanding is based at least on performing semantic segmentation of the image data and detecting one or more objects within the environment based on the semantic segmentation. In some implementations, determining the context of the experience includes determining an activity of the user based on the scene understanding of the environment. In some implementations, the sensor data includes location data of the user, and determining the context of the experience includes determining a location of the user within the environment based on the location data.

In some implementations, the method 500 includes updating a view of a display of the electronic device during the first period of time based on determining that the user has the first gaze behavior state during the first period of time. For example, in response to a correlation between some event (e.g., an eye movement) then an application on a display performs some type of response (e.g., a user interacted with a selectable element on the GUI). In some implementations, updating the view of the display is based on the eye data and/or the head data. For example, based on a gaze behavior associated with a head or eye movement (e.g., a particular type of classification), then the application performs particular action.

Figure 6:
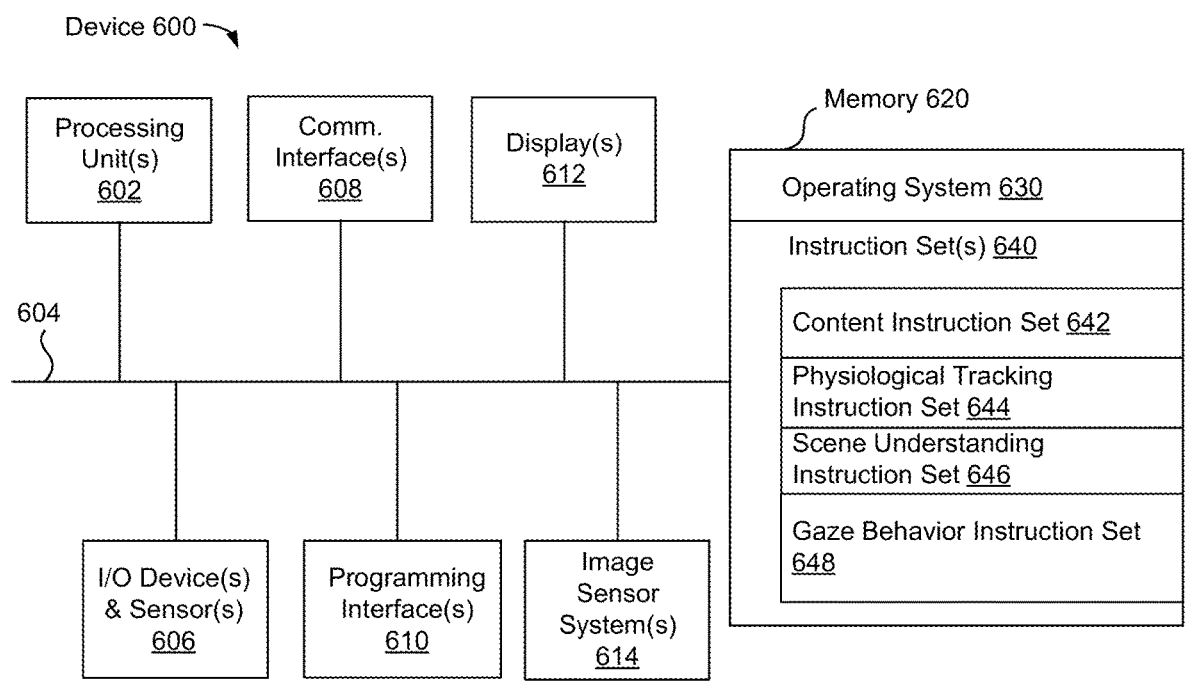
FIG. 6 is a block diagram illustrating device components of an exemplary device according to some implementations.

FIG. 6 is a block diagram of an example device 600. Device 600 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 10 includes a single display. In another example, the device 10 includes a display for each eye of the user.

In some implementations, the one or more image sensor systems 614 are configured to obtain image data that corresponds to at least a portion of the physical environment 105. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 include a content instruction set 642, a physiological tracking instruction set 644, a scene understanding instruction set 646, and a gaze behavior instruction set 648. The instruction set(s) 640 may be embodied a single software executable or multiple software executables.

In some implementations, the content instruction set 642 is executable by the processing unit(s) 602 to provide and/or track content for display on a device. The content instruction set 642 may be configured to monitor and track the content over time (e.g., during an experience) and/or to identify change events that occur within the content (e.g., based on identified/classified behavior gaze events). In some implementations, the content instruction set 642 may be configured to inject change events into content (e.g., feedback mechanisms) using one or more of the techniques discussed herein or as otherwise may be appropriate. To these ends, in various implementations, the instruction includes instructions and/or logic therefor, and heuristics and metadata therefor.

In some implementations, the physiological tracking instruction set 644 is executable by the processing unit(s) 602 to track a user's physiological attributes (e.g., EEG amplitude/frequency, pupil modulation, gaze, head pose/location data, heart rate, EDA data, etc.) using one or more of the techniques discussed herein or as otherwise may be appropriate. To these ends, in various implementations, the instruction includes instructions and/or logic therefor, and heuristics and metadata therefor.

In some implementations, the scene understanding instruction set 646 is executable by the processing unit(s) 602 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

In some implementations, the gaze behavior instruction set 648 is executable by the processing unit(s) 602 to assess the physiological data (e.g., eye data and head data) and determine that the user has a first gaze behavior state during a period of time to identify gaze shifting events, gaze holding events, and loss events using one or more of the techniques discussed herein or as otherwise may be appropriate. To these ends, in various implementations, the instruction includes instructions and/or logic therefor, and heuristics and metadata therefor.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately may be combined and some items may be separated. The actual number of instructions sets and how features are allocated among them may vary from one implementation to another and may depend in part on the particular combination of hardware, software, and/or firmware chosen for a particular implementation.

Figure 7:
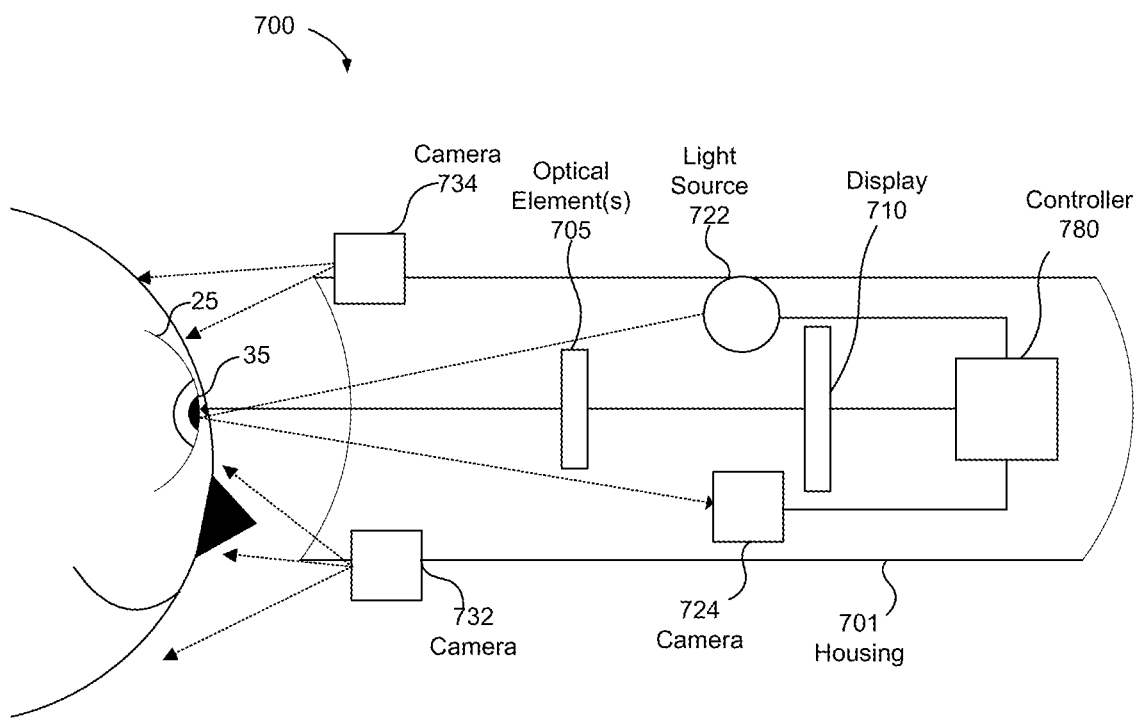
FIG. 7 is a block diagram of an example head-mounted device (HMD) in accordance with some implementations.

FIG. 7 illustrates a block diagram of an exemplary head-mounted device 700 in accordance with some implementations. The head-mounted device 700 includes a housing 701 (or enclosure) that houses various components of the head-mounted device 700. The housing 701 includes (or is coupled to) an eye pad (not shown) disposed at a proximal (to the user 25) end of the housing 701. In various implementations, the eye pad is a plastic or rubber piece that comfortably and snugly keeps the head-mounted device 700 in the proper position on the face of the user 25 (e.g., surrounding the eye of the user 25).

The housing 701 houses a display 710 that displays an image, emitting light towards or onto the eye of a user 25. In various implementations, the display 710 emits the light through an eyepiece having one or more optical elements 705 that refracts the light emitted by the display 710, making the display appear to the user 25 to be at a virtual distance farther than the actual distance from the eye to the display 710. For example, optical element(s) 705 may include one or more lenses, a waveguide, other diffraction optical elements (DOE), and the like. For the user 25 to be able to focus on the display 710, in various implementations, the virtual distance is at least greater than a minimum focal distance of the eye (e.g., 7 cm). Further, in order to provide a better user experience, in various implementations, the virtual distance is greater than 1 meter.

The housing 701 also houses a tracking system including one or more light sources 722, camera 724, camera 732, camera 734, and a controller 780. The one or more light sources 722 emit light onto the eye of the user 25 that reflects as a light pattern (e.g., a circle of glints) that can be detected by the camera 724. Based on the light pattern, the controller 780 can determine an eye tracking characteristic of the user 25. For example, the controller 780 can determine a gaze direction and/or a blinking state (eyes open or eyes closed) of the user 25. As another example, the controller 780 can determine a pupil center, a pupil size, or a point of regard. Thus, in various implementations, the light is emitted by the one or more light sources 722, reflects off the eye of the user 25, and is detected by the camera 724. In various implementations, the light from the eye of the user 25 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 710 by looking at it), provide foveated rendering (e.g., present a higher resolution in an area of the display 710 the user 25 is looking at and a lower resolution elsewhere on the display 710), or correct distortions (e.g., for images to be provided on the display 710).

In various implementations, the one or more light sources 722 emit light towards the eye of the user 25 which reflects in the form of a plurality of glints.

In various implementations, the camera 724 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 724 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 732 and camera 734 are frame/shutter-based cameras that, at a particular point in time or multiple points in time at a frame rate, can generate an image of the face of the user 25. For example, camera 732 captures images of the user's face below the eyes, and camera 734 captures images of the user's face above the eyes. The images captured by camera 732 and camera 734 may include light intensity images (e.g., RGB) and/or depth image data (e.g., Time-of-Flight, infrared, etc.).

According to some implementations, the electronic devices (e.g., device 10, device 600, device 700) can generate and present an extended reality (XR) environment to one or more users during a communication session. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor and one or more sensors:
   obtaining eye data associated with a gaze having gaze characteristics during a first period of time;
   obtaining head data during the first period of time, wherein the head data comprises head representation data and head tracking information associated with a head position and a head movement during the first period of time; and
   determining a first gaze behavior state during the first period of time based on the eye data and the head data, wherein determining the first gaze behavior state comprises:
      determining that the gaze characteristics correspond to a gaze shifting
   event if the head data has first characteristics associated with a first activity of a user, and
      determining that the same gaze characteristics correspond to a gaze holding event if the head data has second characteristics associated with a second activity of the user different than the first activity, wherein the second characteristics are different than the first characteristics, and
      wherein the first activity and the second activity are included in a plurality of activities associated with the user, the plurality of activities comprising at least one of: lying, standing, sitting, and walking.

2. The method of claim 1, further comprising:
determining a scene understanding of a physical environment based on obtaining sensor data from the one or more sensors corresponding to the physical environment.

3. The method of claim 2, wherein determining the first gaze behavior state during the first period of time is based on the scene understanding of the physical environment.

4. The method of claim 2, wherein the physical environment comprises one or more objects, and wherein determining the scene understanding of the physical environment comprises determining a location, a speed, or a direction of motion of the one or more objects.

5. The method of claim 2, wherein determining a scene understanding comprises generating a three-dimensional (3D) representation of the physical environment.

6. The method of claim 1, wherein the eye data comprises positional information and velocity information for a left eye and a right eye.

7. The method of claim 1, wherein the eye data comprises an interpupillary distance (IPD) between a right eye and a left eye, and a diameter of the left eye and a diameter of the right eye.

8. The method of claim 1, wherein the eye data comprises:
a direction of the gaze; or
a velocity of the gaze.

9. The method of claim 1, wherein the eye data comprises an image of an eye or electrooculography (EOG) data.

10. The method of claim 1, wherein the head data comprises images of a head from the one or more sensors.

11. The method of claim 1, wherein obtaining the head data comprises tracking a pose and a movement of a head as the head tracking information.

12. The method of claim 1, wherein determining the first gaze behavior state during the first period of time is further based on a set of data acquired prior to the first period of time.

13. The method of claim 1, wherein the first gaze behavior state is a type of gaze behavior state of a plurality of gaze behavior states, wherein the plurality of gaze behavior states comprises a gaze holding state, a gaze shifting state, and an eye tracking loss state.

14. The method of claim 13, further comprising:
identifying a gaze shifting event during the first period of time based on determining that the first gaze behavior state comprises a fast gaze state during the first period of time.

15. The method of claim 13, further comprising:
identifying a gaze holding event during the first period of time based on determining that the first gaze behavior state comprises a stabilizing gaze state during the first period of time.

16. The method of claim 1, further comprising:
updating a view of a display of the electronic device during the first period of time based on determining the first gaze behavior state during the first period of time.

17. The method of claim 16, wherein updating the view of the display is based on the eye data or the head data.

18. The method of claim 1, wherein the first gaze behavior state during the first period of time is based on using a machine learning classifier model, wherein the eye data and the head data are input into the machine learning classification model to identify gaze shifting events, gaze holding events, and loss events.

19. The method of claim 18, wherein the machine learning classification model is trained based on a plurality of body poses.

20. The method of claim 19, wherein the plurality of body poses comprises a lying pose, a standing pose, a sitting pose, a walking pose, or a combination thereof.

21. The method of claim 1, wherein the eye data or the head data is obtained from sensor data from the one or more sensors, and wherein the sensor data comprises depth data and light intensity image data obtained during a scanning process.

22. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
   obtaining eye data associated with a gaze having gaze characteristics during a first period of time;

obtaining head data during the first period of time, wherein the head data comprises head representation data and head tracking information associated with a head position and a head movement during the first period of time; and determining a first gaze behavior state during the first period of time based on the eye data and the head data, wherein determining the first gaze behavior state comprises:

determining that the gaze characteristics correspond to a gaze shifting event if the head data has first characteristics associated with a first activity of a user, and determining that the same gaze characteristics correspond to a gaze holding event if the head data has second characteristics associated with a second activity of the user different than the first activity, wherein the second characteristics are different than the first characteristics, and wherein the first activity and the second activity are included in a plurality of activities associated with the user, the plurality of activities comprising at least one of: lying, standing, sitting, and walking.

23. The device of claim 22, wherein the program instructions further cause the one or more processors to perform operations comprising:

determining a scene understanding of a physical environment based on obtaining sensor data from one or more sensors corresponding to the physical environment.

24. A non-transitory computer-readable storage medium, storing program instructions executable on a device to perform operations comprising:

obtaining eye data associated with a gaze having gaze characteristics during a first period of time;

obtaining head data during the first period of time, wherein the head data comprises head representation data and head tracking information associated with a head position and a head movement during the first period of time; and determining a first gaze behavior state during the first period of time based on the eye data and the head data, wherein determining the first gaze behavior state comprises:

determining that the gaze characteristics correspond to a gaze shifting event if the head data has first characteristics associated with a first activity of user, and determining that the same gaze characteristics correspond to a gaze holding event if the head data has second characteristics associated with a second activity of the user different than the first activity, wherein the second characteristics are different than the first characteristics, and wherein the first activity and the second activity are included in a plurality of activities associated with the user, the plurality of activities comprising at least one of: lying, standing, sitting, and walking.

* * * * *